United States Patent [19]

Taig

[11] 4,117,864

[45] Oct. 3, 1978

[54] POWER STEERING CONTROL VALVE

[75] Inventor: Alistair Gordon Taig, South Bend, Ind.

[73] Assignee: The Bendix Corporation, Southfield, Mich.

[21] Appl. No.: 833,530

[22] Filed: Sep. 15, 1977

[51] Int. Cl.² .............................................. F15B 9/08
[52] U.S. Cl. .............................. 137/625.23; 91/375 R
[58] Field of Search ...................... 137/625.21, 625.23, 137/625.24, 625.22; 91/375 A, 375 R

[56] References Cited

U.S. PATENT DOCUMENTS

| 3,867,870 | 2/1975 | Shimoura | 91/375 A X |
|---|---|---|---|
| 4,034,825 | 7/1977 | Adams | 91/375 A X |

*Primary Examiner*—Alan Cohan

*Attorney, Agent, or Firm*—Paul David Schoenle; Ken C. Decker

[57] ABSTRACT

A power steering control device includes a housing for receiving an input member and an output member which are rotatably disposed within a valve sleeve sealingly engaging the housing. The input member, output member and valve sleeve include axially aligning grooves for receiving at least one projection which limits the rotation of the input member, output member and valve sleeve relative to each other. The housing communicates with a fluid pressure source and the input member is rotatable relative to the valve sleeve such that the one projection cooperates with the input member and the valve sleeve to control fluid flow through the valve sleeve. Moreover, the input member, valve sleeve and one projection are releasably held together to form a unitary assembly which connects with the output member within the housing.

14 Claims, 5 Drawing Figures

4,117,864

POWER STEERING CONTROL VALVE

BACKGROUND OF THE INVENTION

In my prior U.S. application Ser. No. 666,836, presently U.S. Pat. No. 4,057,079, a fluid power assistance control valve is described wherein an output member is provided with a blind bore for receiving an input member. Matching slots are provided on the input and output members for receiving a pair of projections which limit the rotation between the input and output members.

The projections cooperate with the input member and the output member to define fluid paths which communicate with an outlet. Fluid flow through the paths either increases or decreases, depending on the direction of rotation between the input and output members. Moreover, the projections cooperate with the input member and the output member to define reaction cavities which communicate with the fluid paths such that fluid communicated to one of the reaction cavities opposes the rotation of the input member.

SUMMARY OF THE INVENTION

The present invention is an improvement of the fluid power assistance control valve disclosed in U.S. Pat. No. 4,057,079. In the present invention the control valve includes a housing communicating with a fluid pressure source and a stepped bore within the housing receives a valve sleeve in sealing relation. Releasably coupled to the valve sleeve is an input member which extends into a bore on the valve sleeve an an output member is also received in the valve sleeve bore. Radially aligning grooves on each of the valve sleeve, input member, and output member receive at least one projection which limits the rotation therebetween. Consequently, the one projection extends axially over the length of the valve sleeve.

In addition, the input member is provided with a blind bore for receiving a radially aligning lug on the output member and a radial flange on the output member is disposed within the valve sleeve bore. Radially expanding snap rings urge the projections radially outwardly to frictionally engage the valve sleeve and slots on the one projection receive the radially expanding snap rings which oppose shoulders on the input member to hold the input member, valve sleeve and one projection together as a unitary assembly.

DETAILED DESCRIPTION

Figure 1:
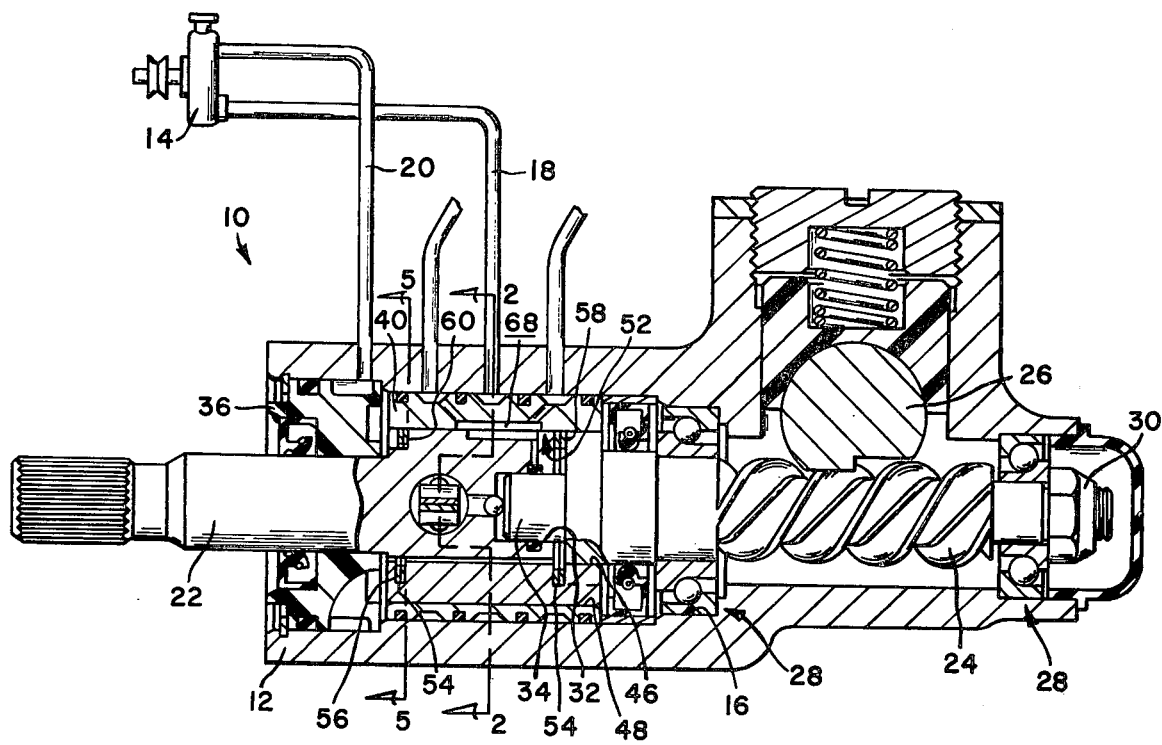
FIG. 1 is a schematic view partly in cross section illustrating a control valve according to the present invention taken substantially along the line 1—1 of FIG. 2.

Turning to FIG. 1, a control valve constructed in accordance with the present invention is generally indicated at 10. A housing 12 communicates with a fluid pressure source 14, such as a power steering pump on a vehicle (not shown). The fluid pressure source 14 is communicated with a stepped bore 16 within the housing by means of an inlet 18 and an outlet 20 returns fluid to the pressure source 14.

An input member 22 operatively connects with a steering wheel (not shown) on the vehicle for rotation relative to the housing 12 and an output member 24 cooperates with the input member 22, in a manner to be described hereinafter, to impart movement to a steering gear 26, such as a rack in a vehicle steering system. The output member 24 rotates within the housing stepped bore 16 on a pair of bearings at 28 and a nut 30 axially retains the output member within the stepped bore 16. In order to compactly arrange the output member and the input member, as well as radially aligning the same within the stepped bore 16, the input member 22 includes a blind bore 32 and a lug 34 on the output member 24 extends into the blind bore 32. A plug 36 closes one end of the stepped bore 16 and supports the input member 22 to permit rotation of the latter relative to the plug 36.

Figure 3:
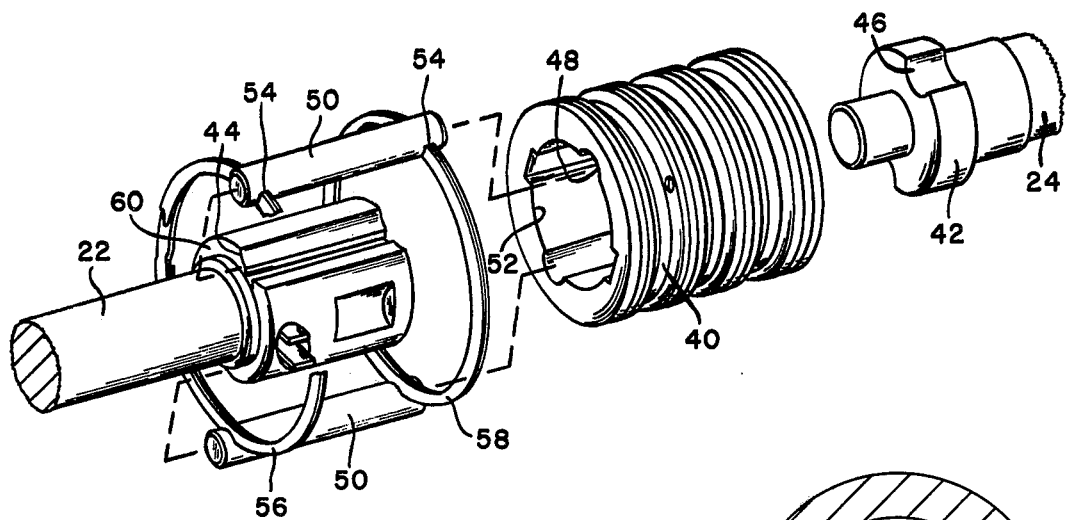
FIG. 3 is an exploded disassembled perspective view of a portion of the control valve of FIG. 1.
Figure 5:
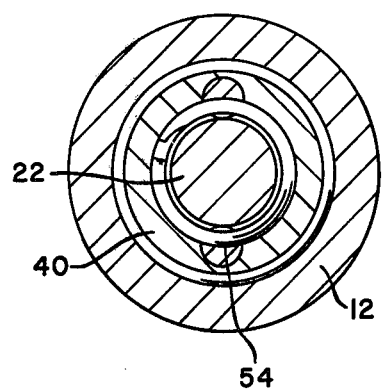
FIG. 5 is a cross-sectional view taken along line 5—5 of FIG. 1.

In accordance with the invention the input member 22 carries a valve sleeve 40 which sealingly engages the stepped bore 16. The valve sleeve 40 cooperates with the input member 22 to control the flow of fluid from the pressure source 14 to a hydraulic actuator (not shown) which is coupled to the steering gear 26 in order to provide a power assist to the movement of the latter. The valve sleeve 40 functions in the same manner as the second valve member of my U.S. Pat. No. 4,057,079 to provide a power assist to the movement of the steering gear 26. Viewing FIG. 3, it is seen that the input member 22 and a radial flange 42 on the output member 24 include radially aligning grooves 44 and 46, respectively, which oppose a groove 48 on the valve sleeve 40. Projections at 50 are disposed within the grooves so that the rotation between the input member 22, valve sleeve 40 and output member 24 is limited, when the input member 22 and the radial flange 42 are disposed within a bore 52 on the valve sleeve 40.

Figure 4:
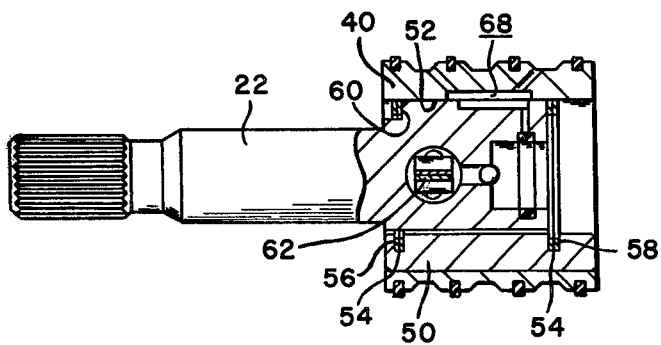
FIG. 4 is a cross-sectional view of a unitary assembly of a portion of the control valve of the present invention.

Turning to FIG. 4, it is seen that slots at 54 on the projections 50 receive snap rings 56 and 58. The snap rings radially expand into the slots 54 and urge the projections 50 into frictional engagement with the valve sleeve. With the snap ring 56 axially opposing the shoulder 60 on the input member 22 and the snap ring 58 axially opposing the leasing end of the input member 22, it is clear that the snap rings oppose axial movement between the input member and the projections. In addition, the projections frictionally oppose axial movement relative to the valve sleeve, so that the input member, projections, and valve sleeve are releasably coupled or connected together as a unitary assembly for insertion into the housing stepped bore 16.

Figure 2:
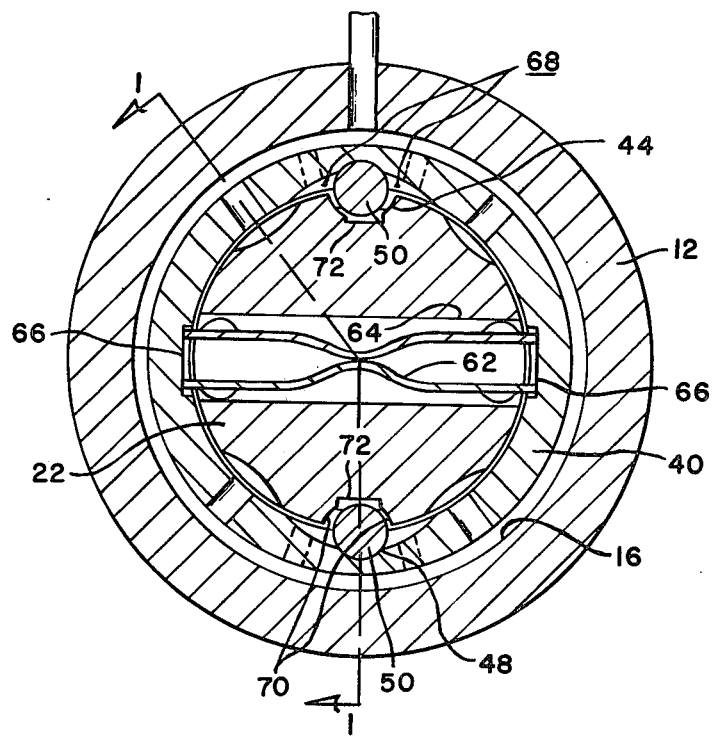
FIG. 2 is an enlarged cross-sectional view taken along line 2—2 of FIG. 1.

As a resistance to limited rotation between the input member 22 and the valve sleeve 40, a spring 62 extends from an opening 64 in the input member 22 into oppositely disposed slots 66 on the valve sleeve 40, viewing FIG. 2. This spring operates in conjunction with fluid pressure communicated via cutouts 68 to the reaction cavities at 70 to resist relative rotation between the input member and the valve sleeve. In addition, the grooves 44 on the input member 22 include channels 72 to assist in communicating pressurized fluid away from the reaction cavities. While the grooves 44 on the input member 22 cooperate with the projections 50 to form the reaction cavities at 70, the grooves 46 on the output member 24 and the grooves 48 on the valve sleeve 40 substantially conform to the radius of curvature for the projections 50 so that the valve sleeve 40 and output member 24 substantially rotate in unison.

Although the control valve herein operates in the same manner as the control valve of my U.S. Pat. No. 4,057,079, it is noted that the present invention provides a compact unit which is easily manufactured and assembled in view of the provision for a valve sleeve which is releasably connected with the input member.

It is evident that many variations are apparent to those skilled in the art and it is intended that these variations fall within the scope of the appended claims.

I claim:

1. A control device comprising:
   a housing having a bore therein;
   a valve sleeve rotationally disposed within said housing bore and including a bore therethrough;
   a rotatable input member extending into said valve sleeve bore;
   a rotatable output member extending into said valve sleeve bore and opposing said rotatable input member; and
   at least one projection disposed between said valve sleeve and said rotatble input and output members, said projection limiting the rotation between said valve sleeve and said rotatable input member and between said valve sleeve and said rotatable output member.

2. The control device of claim 1 in which said valve sleeve includes an inner groove and said rotatable input and output members include outer grooves which register with the valve sleeve inner groove, said one projection extending into the grooves to limit the rotation between the input member, the output member and the valve sleeve.

3. The control device of claim 2 in which said rotatable input member outer groove includes a channel.

4. The control device of claim 1 in which said rotatable input member, said valve sleeve and said one projection are releasably held together to form a unitary assembly for insertion in said housing bore.

5. The control device of claim 4 in which said rotatable input member, said valve sleeve and said one projection are releasably held together by a pair of snap rings.

6. The control device of claim 5 in which one of said pair of snap rings is disposed between said rotatable input member and said rotatable output member.

7. The control device of claim 1 in which said rotatable input member includes a blind bore and said rotatable output member includes a lug which is received within the blind bore.

8. A fluid power assistance control device comprising:
   a housing having a bore therein which communicates with a fluid power source;
   a valve sleeve disposed within said housing bore and having a bore therethrough;
   an input member extending into said valve sleeve bore;
   an output member extending into said valve sleeve bore and opposing said input member; and
   at least one projection between said valve sleeve and said input member, said one projection cooperating with said valve sleeve and said input member to substantially define a pair of fluid paths which receive pressurized fluid from the pressure source and limit the rotation therebetween;
   said input member being rotatable relative to said valve sleeve to increase the fluid flow through one of said pair of fluid paths and to decrease the fluid flow through the other of said pair of fluid paths;
   said one projection also cooperating with said output member and said valve sleeve to limit the rotation therebetween.

9. The fluid power assistance control device of claim 8 in which said output member includes a radially extending flange which is received within the valve sleeve bore, said flange and said input member having radially aligning grooves for receiving said one projection.

10. A control device for a power steering system comprising a housing having an axial bore extending therethrough and communicating with a fluid pressure source via an inlet and an outlet, a valve sleeve sealingly disposed within said housing bore, said valve sleeve having an axial bore extending therethrough, an input member extending into said valve sleeve bore, at least one projection extending axially between said valve sleeve and said input member, said one projection cooperating with said input member and said valve sleeve to control the fluid flow from the fluid pressure source to the outlet, and an output member extending into said valve sleeve bore, said one projection also cooperating with said output member to limit the rotation between said output member and said input member, said input member, valve sleeve and output member having radially aligning grooves for receiving said one projection.

11. The control device of claim 10 in which said input member, valve sleeve and one projection are releasably coupled together to form a unitary assembly for insertion into said housing bore.

12. The control device of claim 11 in which a pair of snap rings are frictionally carried by said valve sleeve bore, said snap rings extending into slots on said one projection and opposing movement of said input member relative to said valve sleeve.

13. The control device of claim 11 in which a pair of snap rings abut said input member and radially urge said projections into frictional engagement with said valve sleeve to frictionally oppose axial movement between said input member and said valve sleeve.

14. The control device of claim 10 in which said valve sleeve bore and said output member include opposing grooves which substantially conform to the radius of curvature for said projections so that when said projections are disposed between said opposing grooves, said valve sleeve and said output member substantially rotate in unison.

* * * * *